United States Patent [19]

Hegedus

[11] Patent Number: 5,106,142

[45] Date of Patent: Apr. 21, 1992

[54] MOBILE ACCOMMODATION UNIT

[76] Inventor: Leslie J. Hegedus, 24 Culross St., London W1Y 3HE, United Kingdom

[21] Appl. No.: 624,711

[22] Filed: Dec. 7, 1990

[30] Foreign Application Priority Data

Dec. 7, 1989 [GB] United Kingdom ............... 8927700

[51] Int. Cl.⁵ ............................................. B60P 3/025
[52] U.S. Cl. .................................... 296/26; 296/21;
52/66; 52/69; 52/72; 52/79.5
[58] Field of Search ................. 296/21, 25, 26, 27,
296/172, 175, 176; 52/64, 66, 67, 68, 69, 71, 72, 79.5

[56] References Cited

U.S. PATENT DOCUMENTS 3,534,997 10/1970 Mitchell, Jr. ...................... 296/176
4,958,874 9/1990 Hegedus ............................. 296/26

FOREIGN PATENT DOCUMENTS 367837 8/1982 Austria .
317357 5/1989 European Pat. Off. ............ 296/26
81/00989 4/1981 PCT Int'l Appl. ................. 296/27

Primary Examiner—Margaret A. Focarino
Assistant Examiner—Andrew C. Pike
Attorney, Agent, or Firm—Weingarten, Schurgin, Gagnebin & Hayes

[57] ABSTRACT

A mobile accommodation unit comprises a vehicle body with side walls which pivot downwardly to provide an expanded floor area, having side-roof support members which pivot upwardly, and which carry canopy structures which unfold upwardly therefrom.

6 Claims, 4 Drawing Sheets

MOBILE ACCOMMODATION UNIT

The present invention relates to a mobile accommodation unit and more particularly to a unit which can house mobile exhibitions. The unit may be stored within a lorry trailer during transport from one exhibition site to another.

BACKGROUND OF THE INVENTION

In European Patent Application 0317357 which corresponds to U.S. Pat. No. 4,958,874, there is disclosed a mobile unit comprising a lorry trailer having an elongate floor, an elongate roof and two generally parallel and elongate side-walls comprising panels which are pivotable relative to the trailer base so as to provide an expanded unit with a larger area than the elongate floor, the trailer also having side-roof portions which unfold therefrom to cover the areas of the expanded unit at each side of the elongate roof, the side-roof portions being mounted on upwardly slidable structural members. Such a unit is suitable for a range of vehicle bodies, but for certain vehicles the necessary cost of modification of the structure becomes prohibitively expensive. In particular the weight of the sliding arrangement necessitates strong support columns extending from the floor of the vehicle.

Expandable trailers are also known from U.S. Pat. No. 3534997 and from PCT Application WO 81/00989. In the former, the expanded floor area pivots downwardly from the side of the vehicle and then the expanded roof portion pivots out from the top of the vehicle. In the latter, the floor again pivots down from the side of the vehicle but the roof is then deployed upwardly from the horizontal floor.

SUMMARY OF THE INVENTION

The present invention seeks to provide an improved mobile unit which has a high roof when expanded but does not require too expensive modification of a standard trailer.

The present invention provides a mobile accommodation unit comprising an expandable vehicle body and having canopy structures as side-roofs for the expanded unit, the canopy structure being carried by side-roof support members which pivot upwardly relative to the vehicle body.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENTS

Basically the present invention provides a mobile accommodation unit comprising a vehicle body having an elongate floor, an elongate roof and two generally parallel and elongate side walls each comprising one or more panels which are pivotable downwardly relative to their vehicle body so as to provide an expanded unit with a larger area, characterised in that the unit also has side-roof support members which are pivotable upwardly relative to the vehicle body and which carry canopy structures which are unfolded upwardly from the side-roof support members to cover the areas of the expanded unit at each side of the vehicle body.

The height of the space within the areas of the expanded unit at each side is up to substantially twice that within the original vehicle body.

Side walls for the expanded unit preferably pivot downwardly from the deployed side-roof support members. Rear walls preferably pivot about vertical axes at or adjacent the edges of a rear wall of the vehicle body. These features permit an enclosed expanded unit to be quickly and conveniently erected.

A problem with canopies is ensuring that the material is not caught or snagged during folding up. This can prevent proper and full folding and/or can damage the canopy material.

Thus in one preferred embodiment of the present invention there is provided a canopy the cross-section of which is of sector shape, the canopy material being unfolded and braced by hoop members which travel along the arc of the sector, wherein the sector-shaped ends of the canopy are covered by respective portions of the canopy material and means are provided for moving said portions outwardly during unfolding and/or inwardly during folding.

Said means may comprise outwardly movable ends of web portions of at least some of the hoop members. Instead or in addition said means may comprise a plurality of interconnected and mutually-folding leaf members also connected to arm portions of the hoop members.

In accordance with another preferred embodiment each canopy is mounted on a canopy structure comprising a pivot assembly upon which are mounted a plurality of hoop members supporting the canopy material, the hoop members being substantially horizontal when the canopy is folded and extending over an arc of substantially 90° when the canopy is unfolded, the arrangement being such that the lowermost hoop member remains substantially horizontal throughout the folding and unfolding procedures.

This enables a canopy to be provided which is completely sealed against the ingress of rain. Snagging and tearing of the canopy material are also avoided.

Figure 1:
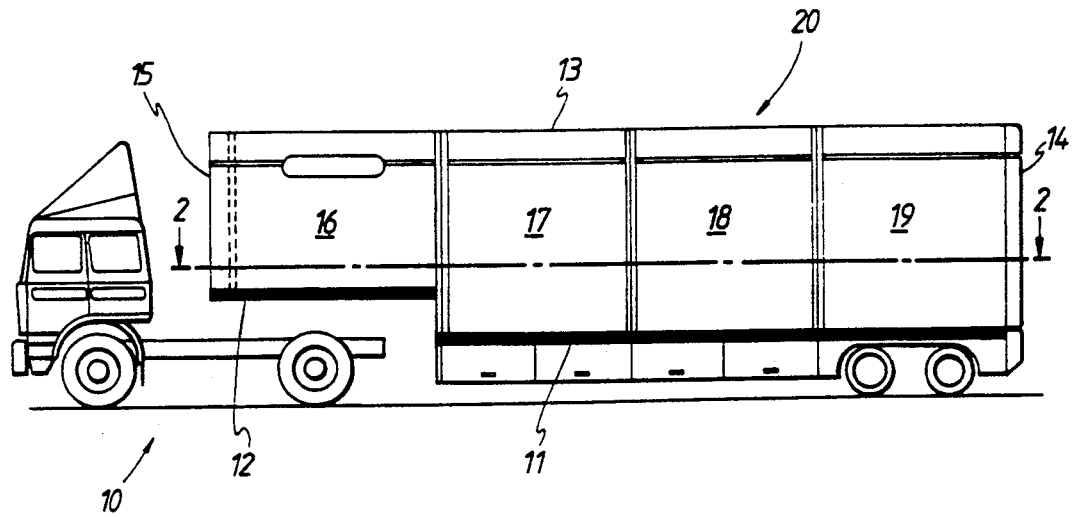
FIG. 1 is a side view of a lorry trailer having a mobile accommodation unit in accordance with a first embodiment of the present invention.

Referring to FIG. 1, there is shown a lorry tractor unit 10 having a trailer incorporating mobile accommodation unit 20. The trailer has a floor or base 11 with a raised front portion 12, a fixed roof 13, a rear wall 14, a front wall 15, fixed side-wall panels 16, and movable side-wall panels 17, 18, 19. Further details of the trailer are similar to those of the trailer disclosed in European Patent Application 0317357, which corresponds to U.S. Pat. No. 4,958,874. As before the side canopies are conveniently arranged in three independent sections on each side of the unit. However, the way in which the canopies are erected and supported is different, as will now be explained.

Figure 2:
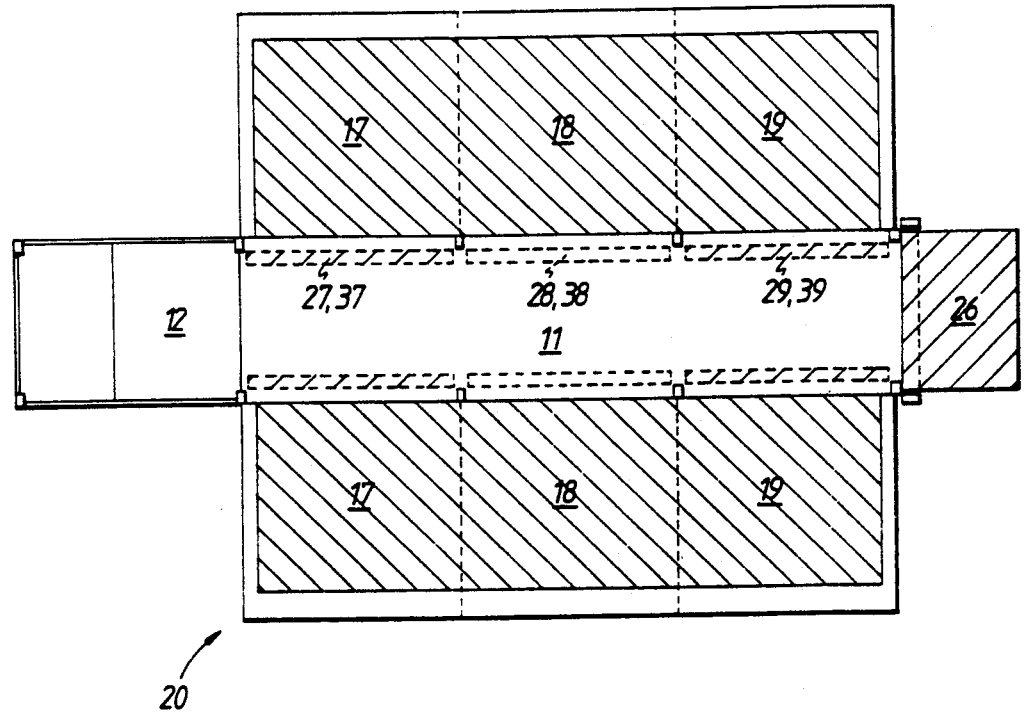
FIG. 2 is a cross section on the line 2—2 of the trailer of FIG. 1 with the unit in a partly unfolded condition.
Figure 3:
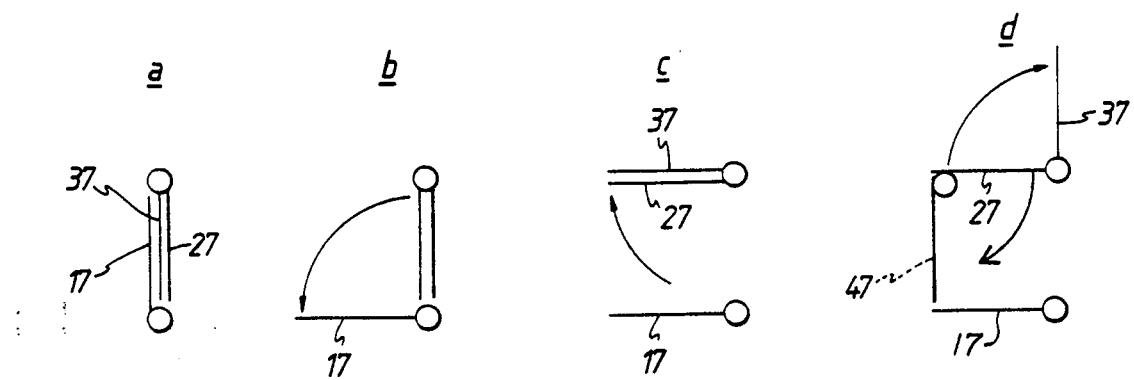
FIG. 3 is a schematic diagram on a smaller scale illustrating how the panels of the unit are deployed.

FIG. 2 shows a partly unfolded unit 20, in which side-wall panels 17, 18 and 19 on both sides of the trailer have been pivoted downwardly about the respective elongate edge of the floor 11 to a substantially horizontal position, see also FIG. 3a and b. This forms an enlarged floor area about three times the area of the trailer. A rear wall panel has also been folded down to form a rear platform 26.

Side roof support members 27, 37 are stored behind each panel 17 in transit and are revealed when the panel is pivoted downwardly. The next state in erecting the unit is the pivoting of both these support members about the respective elongate edge of the roof 13 to a substantially horizontal position, see FIG. 3c. This has not yet been done in the position shown in FIG. 2. However, it will be appreciated that similar support members 28, 38 and 29, 39 are provided behind the other panels 18, 19 and it will be seen that support members 28, 38 on both sides of the trailer have already been deployed in FIG. 2.

Figure 4:
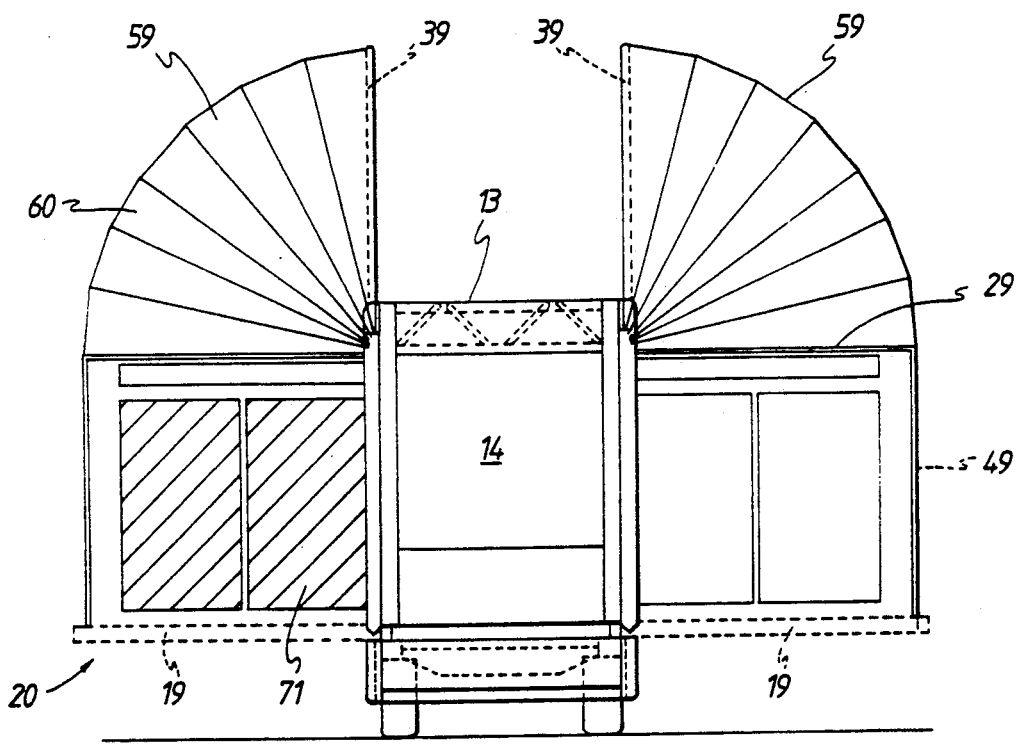
FIG. 4 is a rear end view on an enlarged scale of the unfolded unit having a canopy portion with sector shaped portions having support members with multiple pivot axes.

The canopy sections, e.g. 59 (FIG. 4), are then erected by pivoting support members 37, 38, 39 into a substantially vertical position, FIGS. 3d and 4. The canopy sections comprise sheets of thin material 60 stretched between members 27, 37 etc. by the bracing arrangement shown in FIG. 5, in which the material 60 has been omitted for clarity. The material may be opaque, translucent, or transparent and actually extends over all the surfaces of the support, except the bottom surface which is open to the interior of the unit. As shown, support members 27, 37 are in the form of generally U-shaped hoops which pivot about points 61 defining an axis along an elongate edge of the roof 13. Between hoops 27, 37 and constrained to be located halfway between them is a further hoop 62. Thus when the canopy is fully unfolded, the side arms of hoop 62 extend at 45° to the horizontal.

Figure 5:
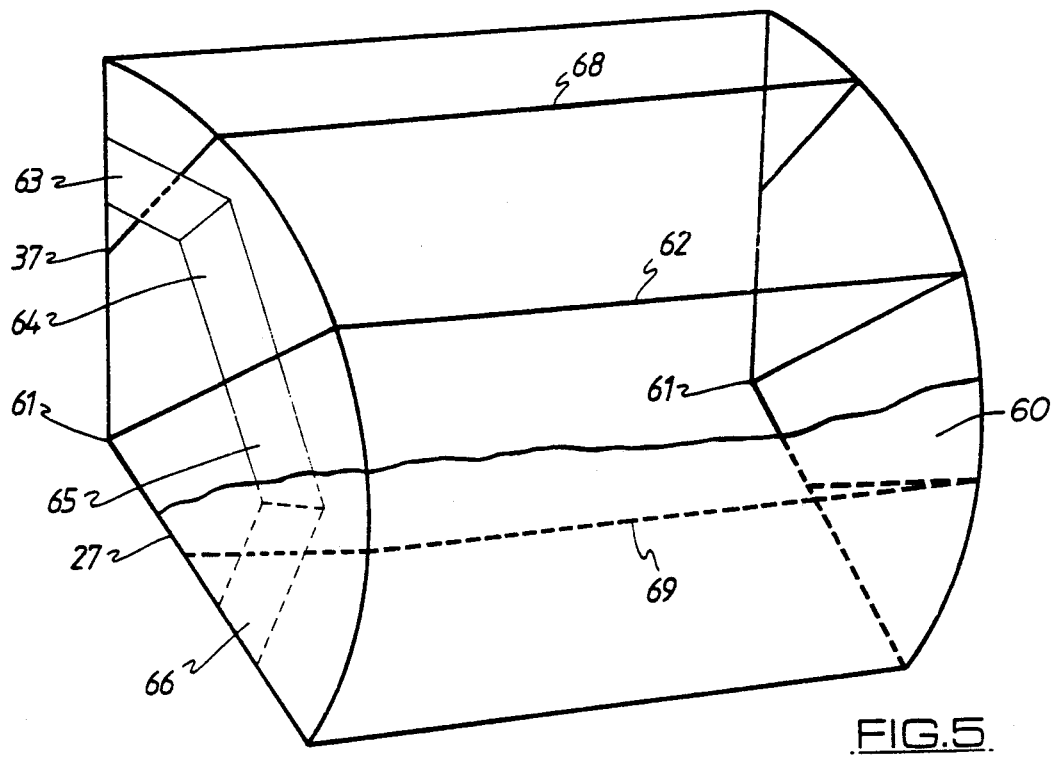
FIG. 5 shows schematically the supporting framework of an unfolded canopy section of a unit having fewer sector shaped portions, and with support members having a single, common pivot axis.

At each side of the canopy there is provided a folding arrangement of interconnected leaf or flap members 63–66, only the left hand side arrangement being shown in FIG. 5. The leaf members 63–66 are of relatively rigid material and extend between support members 37 and 27, the junction between leaves 64 and 65 being attached to hoop 62. When the canopy is folded up, the junction between leaves 63 and 64 and the junction between leaves 65 and 66 are both arranged to fold inwardly. Thus leaves 63–66 operate in the manner of a fan and when the canopy is unfolded they adopt a substantially straight line position generally coplanar with the side-wall of the canopy; to ensure that the leaves 63–66 actually are coplanar, and thus that the canopy material 60 is taut, secondary hoops 68, 69 are provided. It will thus be appreciated that members 63–66 constitute leaf means for moving respective canopy material portions outwardly during unfolding and inwardly during folding.

Hoop 68 is substantially U-shaped, the free ends of its arms being pivotally attached to support member 37 such that when the canopy is unfolded, the arm of hoop 68 lies next to leaf 63 near its junction with leaf 64. Similarly secondary hoop 69 is located adjacent to leaf 66 near its junction with leaf 65. To brace the folding arrangement, the web portions of hoops 68, 69 incorporate means for moving their ends, and the respective hoop arms connected thereto, longitudinally outwards, which has the effect of pushing leaves 63–66 into their coplanar, braced position. Other bracing devices could be used to ensure a coplanar relationship is maintained between leaves 63–66.

The canopies are folded up by reversing the above-described process.

An advantage of the above-described unit is that a canopy erection and support arrangement is provide without the need for bulky support pillars occupying floor space within the unit. In addition the canopy sections form individually-sealed regions which are readily unfolded and braced. The arrangement of bracing hoops has the advantage that the canopy material is not caught between the hoops when being folded up, which could damage the material.

Numerous modifications can be made to the above-described unit. For example leaves 63–66 can be attached to the interior or exterior of material 60 of the canopy section, e.g. by stitching thus ensuring that material is folded clear of the hoops; alternatively the material 60 may not be connected to the leaves, in which case it should be located inwardly of the leaves so that it is folded out of the way of the hoops.

The erection of the unit 20 may be effected manually, or semi- or fully-automatically. Similarly the longitudinal extension of the web portion of hoops 68, 69 may be effected manually or by a separate system, e.g. one incorporating gas stays.

As described, all the canopy sections have side-walls. Thus if it is desired to raise only some of them, this is possible while still maintaining an enclosed interior. Alternatively, the canopy side-walls could be omitted.

If desired the support members 27–29 may carry members 47–49 for forming side-walls for the expanded unit. Side-wall members 47–49 may pivot down or roll out from the respective support member 27, 28 or 29 after the latter has been pivoted into its horizontal position. The members 47–49 may be replaced or supplemented by posts which serve to support the canopy sections. In an alternative arrangement side-wall members 47–49 may pivot up or roll out from the respective floor panel 17–19. Rear walls 71 for the expanded unit may unfold from the expanded floor panel 17 and/or from rear wall 14.

Although the pivot axes for panels 17, 27, 37 etc. have been described as being at the elongate edges of floor 11 and roof 13, the axes may be slightly displaced from these edges. The various support members may be in the form of panels (possibly transparent or translucent) or open frames as desired. Also the surfaces of the canopy sections which, after unfolding, face each other across the roof 13 of the unit, may comprise panels; these panels may incorporate windows.

Various features proposed in U.S. Pat. No. 4,958,874 may be incorporated, for example support feet for the expanded floor, and a main roof portion 13 which can be raised.

Instead of the described arrangement of canopy hoops, an alternative arrangement may be provided in which several hoops have a common axis, but successive hoops are of gradually decreasing size; such an arrangement, especially when combined with means for outwardly moving the ends of the web portions of the hoop (as with hoops 68, 69) also has the advantage that catching of the canopy material is avoided during folding up.

Referring now to FIGS. 6 to 9, there is shown a mobile accommodation unit 120 in accordance with a second embodiment. When being transported as a lorry trailer it corresponds generally to the first embodiment shown in FIG. 1, and has floor or base 111, a roof 113, a rear wall 114 and fixed side-wall panels 116. However at each side instead of three movable panels, the trailer comprises a single movable side-wall panel 180 extending the entire length of floor 111.

Figure 7:
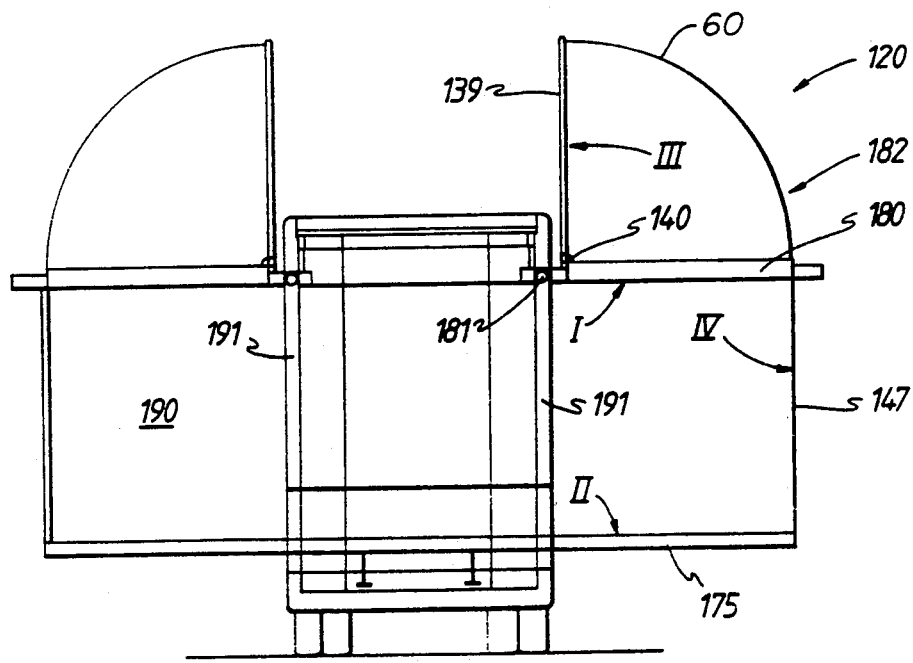
FIG. 7 is a rear end view on an enlarged scale of the unfolded unit of FIG. 6.
Figure 6:
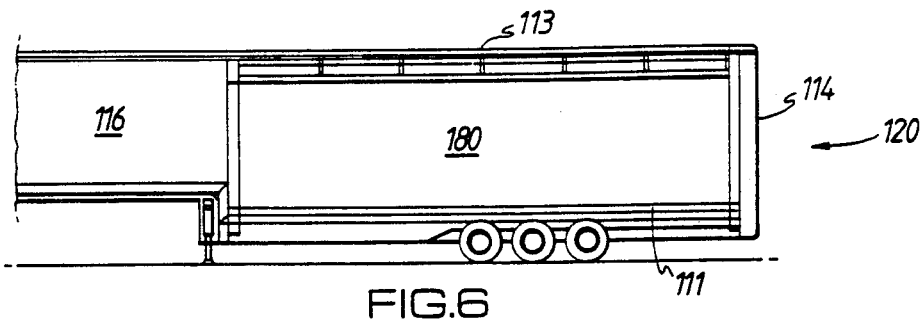
FIG. 6 is a side view of a mobile accommodation unit in accordance with a second embodiment of the present invention.
Figure 8:
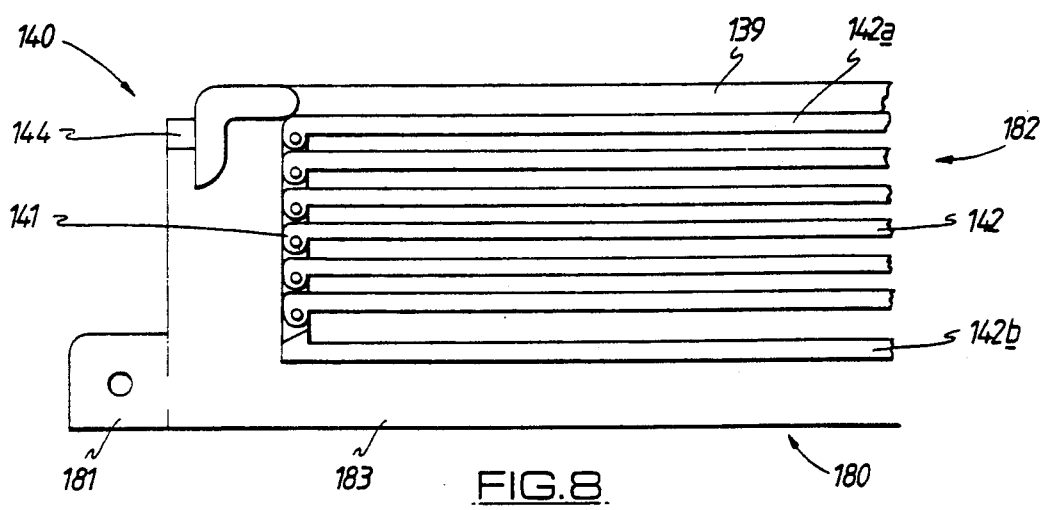
FIG. 8 shows one of the canopy structures of the second embodiment before the canopy is unfolded.
Figure 9:
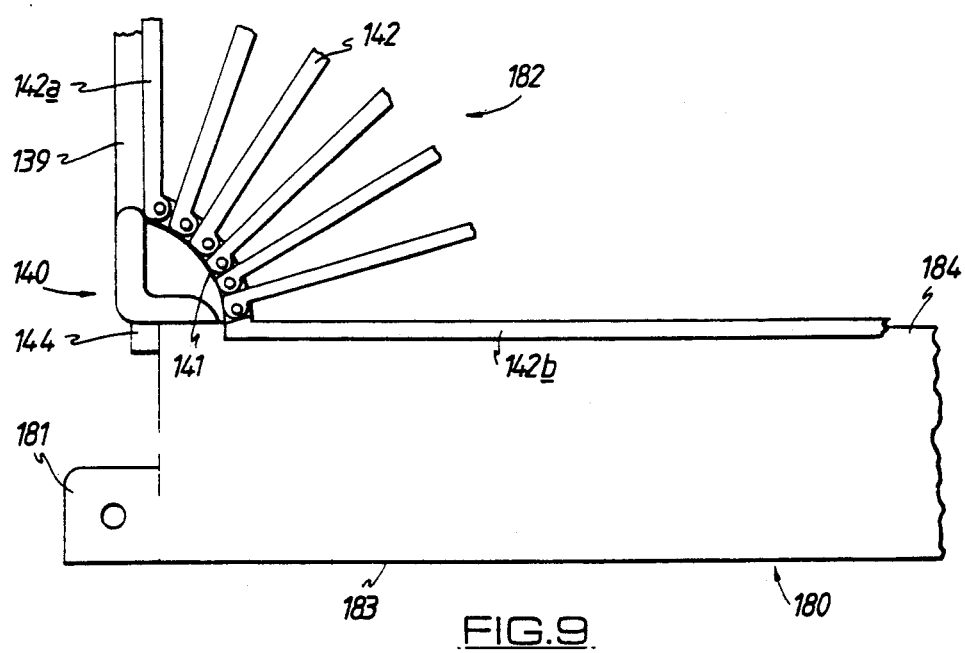
FIG. 9 shows the canopy structure of FIG. 8 when unfolded.

The unit 120 is unfolded generally in a similar fashion to the unit 20 of the first embodiment, however a different canopy structure is employed. FIG. 7 shows a view corresponding to FIG. 4; the preferred order of unfolding at each side is firstly, a single side-roof support member 180 is pivoted up to a horizontal position, secondly a single panel 175 is pivoted down to a horizontal position to form the floor, thirdly three canopy structures 182 are individually deployed, fourthly a side-wall member 147 is pivoted down to a vertical position from the free edge of member 180; and fifthly rear-wall portions 190 are pivoted through 90° about corner stanchions 191 from their original positions lying parallel and adjacent to the respective sides of the vehicle (and corresponding front wall portions are correspondingly pivoted through 90° about front corner stanchions, not shown).

At each side a side roof support member 180 comprises three open flat boxes or trays arranged side-by-side and each holding a respective canopy structure 182. The member 180 is mounted on a pivot 181 on the trailer structure. The deployment of one of the canopy structures 182 will now be described. After member 180 has reached its horizontal position, a hood lid 139 is pivoted into a vertical position about a pivot 144 of a pivot assembly 140 on the member 180. Pivot assembly 140 comprises a chain pivot 141 to which are attached seven hoop members 142, the topmost of which, 142a, is fixedly secured to the lid 139. Pivot 144 is located substantially aligned with top hoop 142a. The canopy material 60 is secured to the hoop members in the manner of a shop blind.

An important feature of the pivot assembly 140 is that, at all times during the canopy unfolding procedure, the lowermost hoop member 142b remains horizontal. During unfolding, hoop member 142b is simply raised vertically from its position along the bottom edge 183 of the box of member 180 shown in FIG. 8 to its position substantially long the top edge 184 of the box shown in FIG. 9. This has an important consequence in that canopy material can be attached to edge 183 and to hoop member 142b and, provided enough slack is allowed material is not torn and folds neatly out of the way as the canopy structure is subsequently folded up again. The edge adjacent pivot assembly 140 is sealed by a strip of canopy material. One edge of the canopy material is secured to the adjacent edge of lid 139, and the material passes between pivot 144 and chain pivot 141 into member 180. This means that all surfaces of the unfolded canopy structure (except its downward facing major surface which is open to the interior of the unit) can be covered with canopy material to form a permanently sealed arrangement.

An advantage of the above-described arrangement is that only four corner stanchions, e.g. 191, are needed to support the entire roof. Thus less modification of a standard trailer is required, and there are no vertical supports interrupting the interior space. Another advantage is that the canopy structures can be repeatedly unfolded and folded without snagging or tearing of the canopy material; in addition the roof is completely sealed against the ingress of rain.

A further advantage of the above-described arrangement is that, if desired, it is not necessary to erect the canopies. By simply extending the unit sideways, i.e steps I, II and IV, but not III, a satisfactory unit is obtained which is enclosed against the weather this is useful if there is a strong wind which could damage the canopy structures.

The various features of the first embodiment, including those disclosed in EP-A-0317357 may also be incorporated in the second embodiment. If desired a single canopy structure may be deployed at each side, though this tends to be less manageable; alternatively two, or more than three canopy structures can be provided along each side of the unit.

In one modification, rear-wall portions 190 are originally folded back substantially parallel to the trailer rear wall 114, and are thus pivoted through 180° to their deployed position; this depends on the trailer being wide enough. The corresponding front wall portions may fold in the same manner.

Bottom hoop 142b normally has three sides (similar to hoop 27 in FIG. 5) but may have four sides if desired.

The roof of the units may be suitable for use as a grandstand and may be provided with railings etc. One or more accesses to the roof are provided, e.g. by replacing platform 26 with an external rear lift, or providing an internal or external staircase, or providing an internal lift instead of one of the canopy sections.

Although described in connection with a lorry trailer, the units may be incorporated in any other suitable vehicle body such as a van or motor caravan.

It will be understood that the above description of the present invention is susceptible to various modifications, changes and adaptations.

I claim:

1. A mobile accommodation unit comprising a vehicle body having an elongate floor, an elongate roof, and two generally parallel and elongate side-walls, each said side-wall comprising at least one panel, said panels being pivotable downwardly relative to said vehicle body so as to provide an expanded unit with an expanded floor, said expanded floor of said expanded unit having a larger area than said floor of said vehicle body, wherein the unit also has side-roof support members, said members being pivotable upwardly relative to said vehicle body and carrying canopy structures, said canopy structures being unfolded upwardly from said side-roof support members to cover said larger area of the expanded unit.

2. A unit according to claim 1 wherein said side-roof support members further comprise side-wall members which are pivotable downwardly from said side-roof support members.

3. A unit according to claim 1 further comprising a canopy having a cross-section of sector shape, said canopy comprising canopy material, said canopy material being unfolded and braced by hoop members travelling along an arc of said sector-shape, whereby the canopy has sector-shaped ends, wherein said sector-shaped ends of said canopy are covered by respective portions of said canopy material and leaf means are provided for moving said respective canopy material portions outwardly during unfolding and inwardly during folding.

4. A unit according to claim 1, wherein at least one of said canopy structures comprises canopy material and a pivot assembly having mounted thereon a plurality of hoop members, said hoop members supporting said canopy material and being substantially horizontal when said at least one canopy structure is folded, and said hoop members extending over an arc of substantially 90° when said at least one canopy structure is unfolded, said at least one canopy structure being such that a lowermost of said hoop members remains substantially horizontal when said at least one canopy structure is folded and unfolded.

5. A unit according to claim 4, wherein said at least one canopy structure further comprises a lid, said lid having fixedly secured thereto a topmost hoop member.

6. A unit according to claim 4, wherein said pivot assembly comprises a chain pivot.

* * * * *